Sept. 16, 1952 L. D. JONES 2,610,428
BAIT CARRIER
Filed Oct. 18, 1948
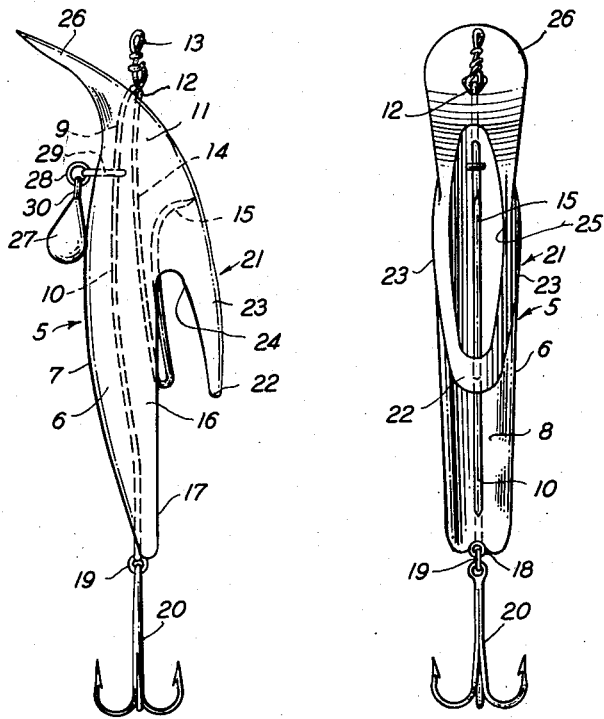
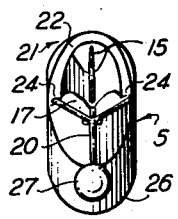
INVENTOR
LEWIS D. JONES
BY
Westall & Westall
ATTORNEYS Patented Sept. 16, 1952

2,610,428

UNITED STATES PATENT OFFICE 2,610,428

BAIT CARRIER

Lewis D. Jones, Lawndale, Calif.

Application October 18, 1948, Serial No. 55,186

2 Claims. (Cl. 43—41)

1

This invention relates to bait carriers for sport fishing and more specifically contemplates a device adapted for the support and protection of bait while trolling.

With conventional equipment, bait attached to the end of a fishing line for trolling purposes is often lost through no fault of the fisherman due to either the disintegration of the bait or to the stealing of the bait from the line by large fish, particularly sharks. While fast trolling minimizes loss due to sharks it increases the tendency toward disintegration of the bait.

It is a principal object of the present invention to provide a device adapted for connection to the end of the fishing line which combines a hook element for attachment of the bait, with means for supporting the latter at a point rearwardly of the hook element so as to partially confine the bait and thereby performs the three-fold function, while trolling, of shielding the bait from excessive buffeting by the water and from the friction and tension upon the bait incident thereto, of protecting the bait from being torn from the line by large fish, and of controlling the movement of live or frozen fish bait as the same is drawn through the water.

More specifically it is an object hereof to provide a light-weight elongated cradle adapted to receive and support a fish or other bait, incorporating an overhanging guard to resist upward displacement of the bait from the cradle, means being provided in the forward end of the cradle for attachment of the device to the fishing line, and having within the cradle, a hook for releasable attachment of the bait.

Still another object is the provision of a device of the character above alluded to, embodying a support for the bait in combination with an element projecting obliquely forward and downward from the point of attachment of the device to the fishing line so as to receive the thrust of the water while trolling and induce the lateral motion of the device first in one direction and then in the other.

Still another object is to provide a carrier for the bait adapted for interposition between the end of a fishing line and the bait and including means extending beneath the bait for support and protection of the latter, in combination with a stabilizer to maintain the bait and support therefor in proper relationship while trolling fast.

Numerous other objects such as the provision of a hook depending from the rearward end of the cradle-support and connected to the line by

2 auxiliary means independent of the body of the device, the provision of an opening in the top of the cradle to facilitate attachment of the bait therein, as well as susceptibility to attractive appearance, simplicity of construction, and the provision of a streamline contour designed to assure natural movement of the bait in the water, will be apparent to those of skill in the art upon an examination of the following description read in the light of the accompanying drawings in which:

Fig. 1 is a vertical side elevation of a bait carrier embodying my invention;

Fig. 2 is a top plan view of the carrier illustrated in Fig. 1;

Fig. 3 is an elevation of the rearward end of the device showing the hook and weight in their relationship with the body as depicted in Fig. 1.

Referring to the drawings more in detail the numerals of which indicate similar parts throughout the several views, 5 designates generally the body of the device which is composed preferably of a synthetic resinous material and may be either transparent, translucent, or colored in any suitable manner. The lower portion of body 5 forms an elongated cradle or bait supporting section 6 the undersurface 7 of which is convex, and having an upper concave surface 8 to receive and support the bait.

In order to assure positive interconnection between the trolling line (not shown), and the various elements of the device associated with the body 5, as about to be described, I provide a doubled wire 9, one reach 10 of which extends the length of the body. The looped end of wire 9 is imbedded in the nose 11 of the body with the loop 12 proper projecting forwardly through the nose for releasable attachment to the trolling line. Connected to the projecting loop 12 is a twisted wire eye 13 to which the line is directly attached. The other reach 14 of the doubled wire 9, projecting rearwardly through the nose 11 of the body into the cradle 6, is looped sharply in the forward part of the cradle and has its upwardly extending end sharpened to form a hook 15 to which the bait (not shown) is attached. Thus the bait, such as live or frozen fish, having its mouth engaged upon the hook, rests principally in the cradle 6, though the bait may be of a length to extend beyond the end of the cradle. It will be seen that the sides 16 of the cradle tend to resist lateral displacement of the bait and co-act with the nose 11 of the body in shielding the bait from the full force of the water while trolling.

The reach 10 of the looped wire 9 extends rearwardly through the nose of the body, bridges the bottom 8 of the intermediate portion of the cradle 6 and is imbedded in the tail section 17 of the latter. The rearward extremity of the reach 10 is looped to form an eye 18 for connection, by a ring 19, of a three-pronged fish hook 20 of conventional design and construction.

At the forward end of the body 5 the sides 16 are extended upwardly flanking the hook 15 and supporting a bait guard or guard section 21, generally U-shaped in plan, the transverse member 22 of which is projected rearwardly by the sides 21 of the guard, so as to overhang the bait and resist upward displacement of the bait from the cradle. The opening or recess 24 formed between each side of the guard and the corresponding side of the cradle is provided to facilitate attachment of the bait to the hook. The generally elliptical opening 25 delineated in the top of the device by the guard 21, the sides 16 and the nose 11 of the body permits access to the point of the hook 15 and accordingly also contributes to facile direction of the bait onto the hook.

The nose 11 of the body is extended obliquely forward and downward in a wide section 26 which functions to induce lateral motion of the device while trolling. The lateral edges of the obliquely-disposed section 26 diverge slightly from the body and its upper surface is preferably slightly concave. As the device is drawn through the water by a line connected to the eye 13, water pressure is exerted unevenly against the concave surface of the section 26, shifting the device to the right or left depending upon the vagaries of the currents and thus imparting movement to the bait suggestive of the action of live unrestrained fish and thereby tending to attract the fish for which the lure is provided.

When trolling relatively fast any tendency for the bait and carrier to become inverted or to revolve in the water is offset by the provision of a stabilizer, which in the embodiment illustrated, consists of a weight 27, attached to the underside of the cradle 6. For this purpose an eye 28 is suspended from the body by a wire tie 29 which extends through the underside of the body and is attached to the reach 10 of the wire 9 at a point adjacent the emergence of the wire from the nose 11 of the device within the cradle. The weight 27 is engaged with the eye 28 by a hook 30 so as to freely swivel with respect to the body during use of the device. Such utility has particular application in fishing for any fish such as bass which tend to strike the front of the bait.

It will be noted (Fig. 1) that the inner surface of the cradle 6 is longitudinally arcuate so as to provide greater depth and capacity in the area thereof in which the hook 15 is disposed. The outer underside of the cradle is correspondingly formed to afford a streamlined contour and thereby facilitate movement of the device through the water while trolling. The continuous arcuate contour of the upper edge of the elevator element 26, the top of the nose portion of the body and the guard 21, contributes not only to the appearance of the carrier but also to its stability in the water due to the fact that the pressure of the water upon the continuously rising upper surfaces of these elements in the area above the point of connection of the trolling line tends to restrain excessive vertical oscillations of the device.

While I have shown but a single embodiment of my invention it will be appreciated that numerous changes in size, design, shape, number and proportion of the various parts may be made without departing from the spirit of my invention as defined by the appended claims.

What I claim and desire to secure by Letters Patent is:

1. In a bait carrier, an elongated body having a nose section and a tail section and forming a cradle intermediate its ends for the support of the bait, and a wire embedded in said body having one end terminating in a point within said cradle for attachment of the bait, said wire extending forwardly through the nose section to form an exterior loop for attachment of a line, and through the tail section to form an exterior loop for attachment of a hook.

2. In a bait carrier, a body, means for attachment of the body to a fishing line, and a hook connected to the body for attachment of a bait, said body having a rearwardly extending bait supporting section and a guard section overhanging said bait section rearwardly of said hook to maintain the bait in a fixed relationship with the bait supporting section, and said body being provided with an opening on each side thereof between the guard section and the corresponding side of the bait suporting section to permit access to said hook.

LEWIS D. JONES.

REFERENCES CITED

The following references are of record in the file of this patent:

UNITED STATES PATENTS

| Number | Name | Date |
| --- | --- | --- |
| 1,101,223 | Welles | June 23, 1914 |
| 1,332,306 | Rush | Mar. 2, 1920 |
| 1,613,113 | Leu | Jan. 4, 1927 |
| 1,814,450 | Nelson | July 14, 1931 |
| 2,302,206 | Gibson et al. | Nov. 17, 1942 |
| 2,359,410 | Edwards | Oct. 3, 1944 |
| 2,500,451 | Codd | Mar. 14, 1950 |